Figure 1:
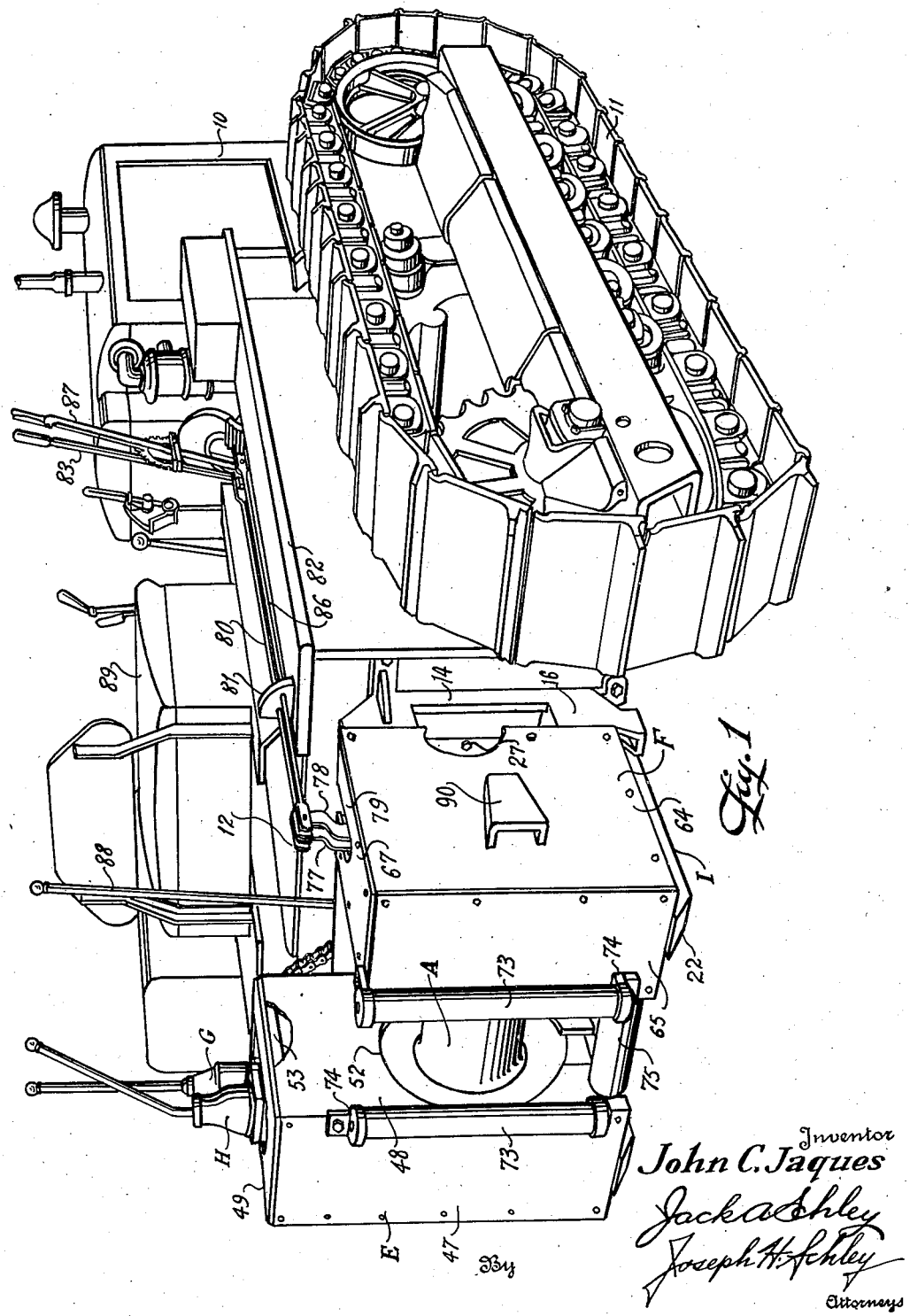

Nov. 26, 1946.    J. C. JAQUES    2,411,626
MOBILE WINCH UNIT
Filed June 1, 1945    4 Sheets-Sheet 2

Inventor
John C. Jaques
By Jack Ashley
Joseph H. Ashley
Attorneys

Nov. 26, 1946.  J. C. JAQUES  2,411,626
MOBILE WINCH UNIT
Filed June 1, 1945  4 Sheets-Sheet 3

John C. Jaques, Inventor

Nov. 26, 1946.   J. C. JAQUES   2,411,626
MOBILE WINCH UNIT
Filed June 1, 1945   4 Sheets-Sheet 4

John C. Jaques, Inventor
By Jack A. Shley
Joseph H. Schley
Attorneys

Patented Nov. 26, 1946

2,411,626

UNITED STATES PATENT OFFICE 2,411,626

MOBILE WINCH UNIT

John C. Jaques, Denison, Tex.

Application June 1, 1945, Serial No. 597,014

5 Claims. (Cl. 254—166)

This invention relates to new and useful improvements in mobile winch units.

One object of the invention is to provide an improved winch unit which may be mounted on the rear end of a standard tractor and connected to the usual power take-off thereof in a simple and convenient manner.

An important object of the invention is to provide an improved winch unit including a cable spool, clutch, brake and driving means having transmission means, together with a mounting support, whereby the elements of the unit may be compactly and conveniently united, as well as adequately housed, so that the complete unit may be readily attached to the rear end of a tractor with a minimum number of parts and a moderate amount of labor.

A further object of the invention is to provide a unique mounting support or carrier on which the winch elements are mounted and which forms a part of the winch unit whereby the mounting of the unit on a tractor is not only facilitated, but may be expeditiously and conveniently carried out; and also, whereby the unit while projecting rearwardly from the tractor housing or body, will be adequately and substantially supported.

Another object of the invention is to provide improved adapter brackets whereby a winch unit may be mounted on a particular type of tractor without materially altering the structure of the tractor.

Another object of the invention is to provide an improved winch unit which may be mounted on the rear end of a tractor, centrally between the treads so as to distribute the load thrusts on the winch, centrally and longitudinally of the tractor; and whereby the elements of the winch are readily accessible.

A further object of the invention is to provide a winch involving an auxiliary transmission and a main transmission connected in sequence for transmitting power from the tractor take-off to the winch spool, whereby a plurality of speeds forward may be obtained which are in excess of the speeds possible with the usual single transmission.

Still another object of the invention is to provide a simple and efficient driving mechanism in which the transmissions are connected in sequence, whereby the number of parts is held to a minimum and also, whereby the mechanism may be disposed for convenient access.

A still further object of the invention is to provide an improved winch unit having a unique cable anchor-loop which may be conveniently carried on the tractor and ready for immediate use and which has its ends secured to the winch unit housing, whereby the load and strain is sustained by the housing and not by the tractor proper, when said anchor-loop is used.

A construction designed to carry out the invention will be hereinafter described together with other features of the invention.

Figure 2:
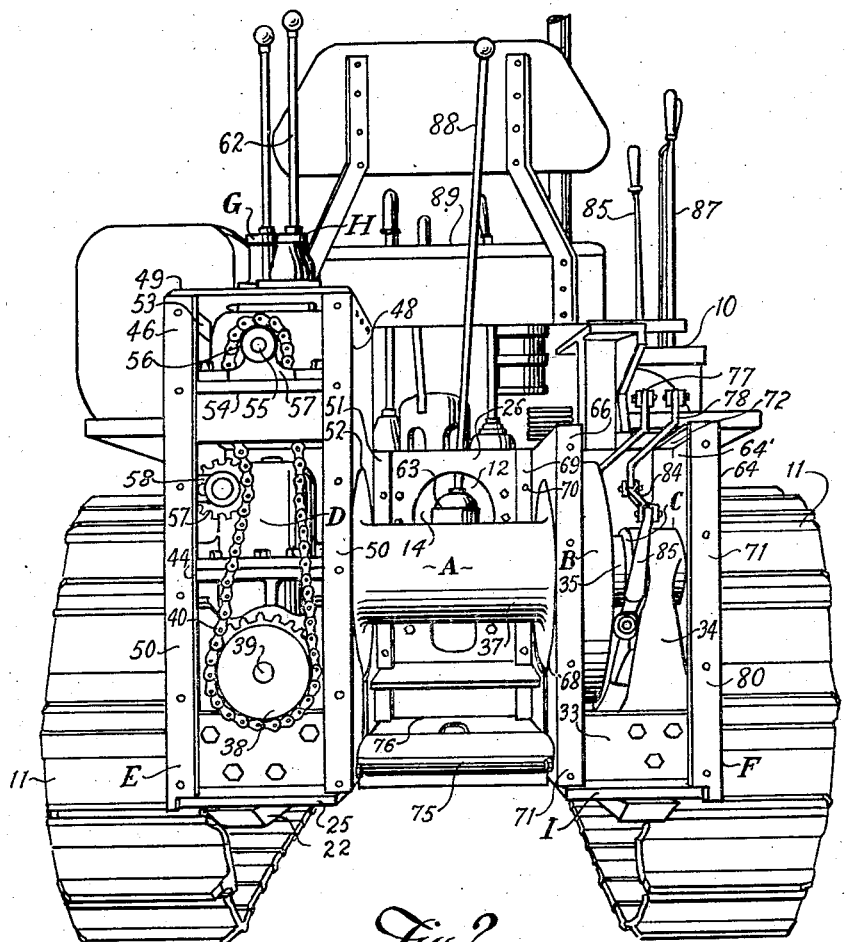
Figure 6:
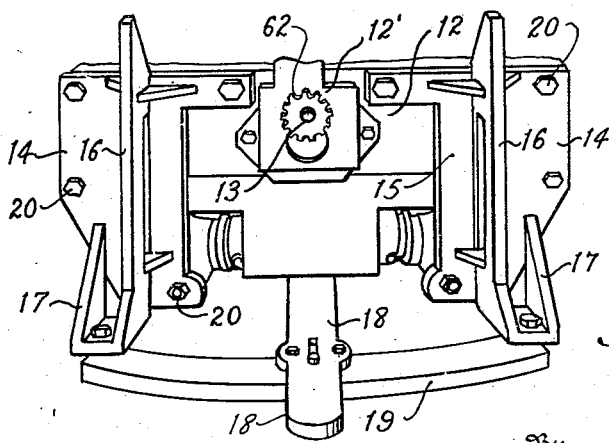
Figure 8:
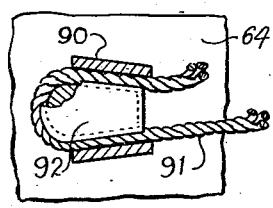
Figure 3:
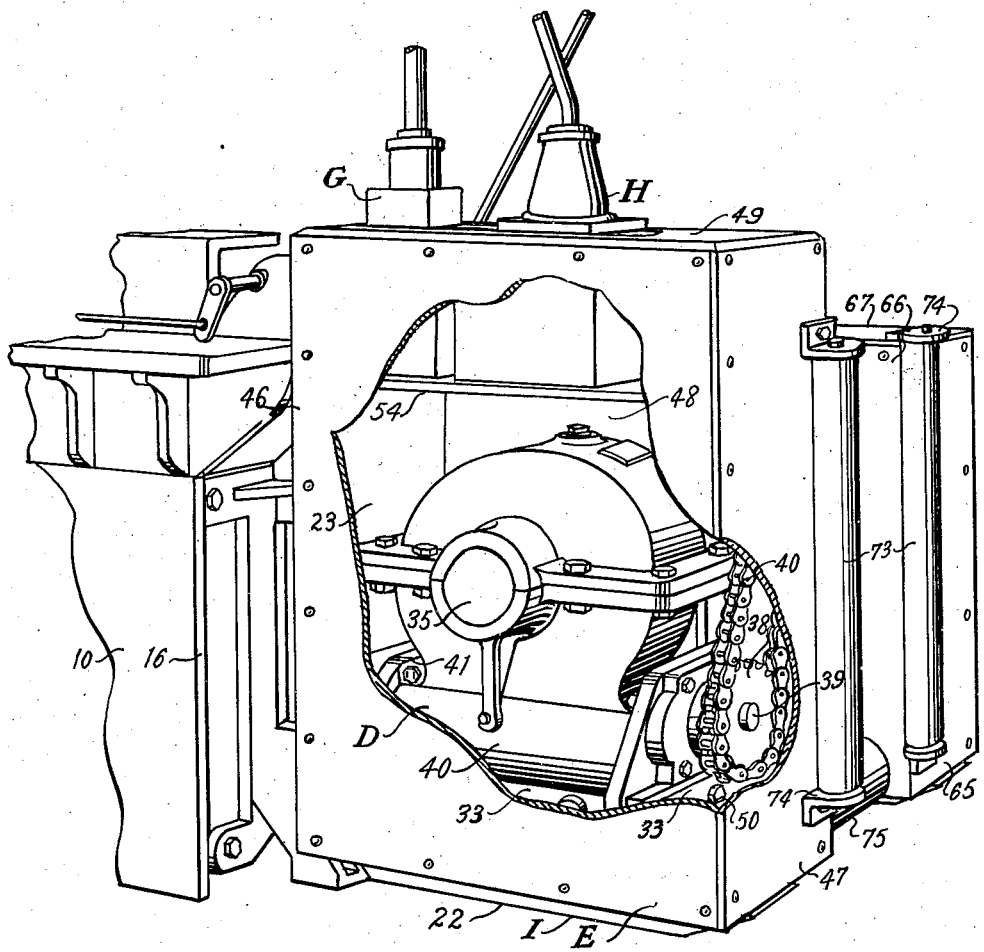
Figure 7:
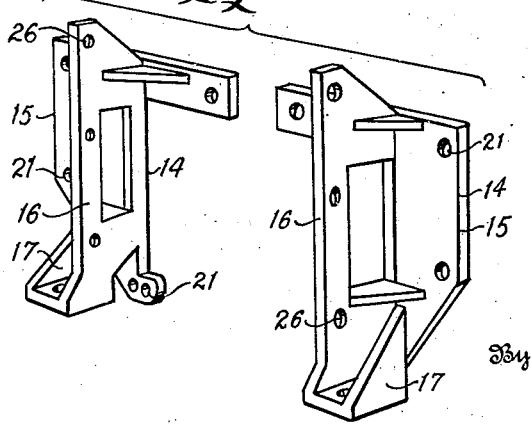
Figures 4, 5:
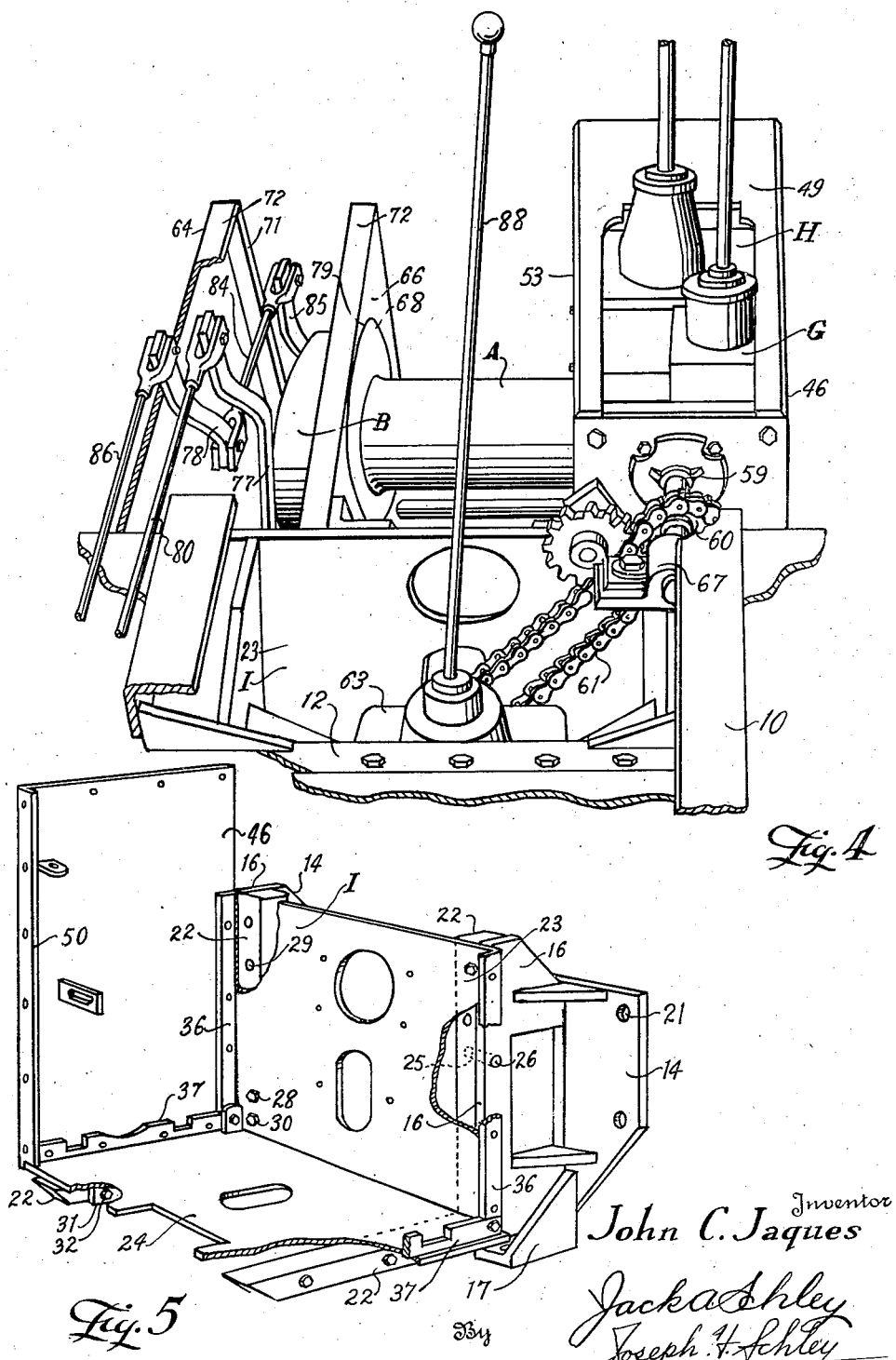

The invention will be more readily understood from a reading of the following specification and by reference to the accompanying drawings, wherein an example of the invention is shown, and wherein:

Fig. 1 is a rear and side perspective view of a tractor equipped with a winch unit constructed in accordance with the invention, Fig. 2 is a similar view looking from the rear of the tractor, the rear and top housing plates omitted, Fig. 3 is a view of the winch unit, partly in perspective and partly in section, Fig. 4 is a perspective view looking rearwardly and downwardly, certain parts of the tractor and winch unit being omitted to illustrate underlying elements, Fig. 5 is a view partly in perspective and partly in section of the carrier and adapter brackets, Fig. 6 is a perspective view of a portion of the rear end of the tractor showing the adapter brackets in place, Fig. 7 is a perspective view of the adapter brackets, and Fig. 8 is a sectional view of the anchor cleat and wedge.

In the drawings, the numeral 10 designates a standard tractor having traveling treads 11. So far as this invention is concerned, the type of tractor is unimportant as the winch unit may be mounted on the rear end of any tractor suitable for the purpose and may have traveling treads or wheels, or a combination of both. Such tractors usually have a gear housing, such as 12, at their rear ends and these housings either have a power take-off or provision whereby a power take-off can be attached to the center of the housing. The housing 12 is shown with a power take-off shaft 12' protruding rearwardly from the upper central portion thereof.

The winch unit in general includes a cable drum or spool A, a brake B, clutch C, a cased gearing D for driving the spool shaft, twin housings E and F, respectively, an auxiliary transmission G and a conventional transmission H connected in sequence, and a carrier I on which the foregoing elements are carried, provided with means which may be attached to adapter brackets for mounting the unit on the rear end of a tractor.

It is to be understood that the adapter brackets will vary according to the particular type of tractor on which the unit is to be mounted. Adapter brackets 14 (Fig. 7) are illustrated and they are particularly adapted for the tractor 10 shown in the drawings. Each bracket includes a vertical plate or web 15 at its medial portion with a rearwardly directed vertical flange 16 with a stirrup 17 at its bottom, as is clearly shown in Figs. 5, 6 and 7. In the type of tractor illustrated, a draw bar 18 is movably supported on a transverse bridle bar 19 (Fig. 6) carried by brackets (not shown) bolted to the rear vertical wall of the housing 12. By removing the draw-bar brackets, stud bolts 20 remain; also, other housing stud bolts 20 are available. The brackets 16 are provided with bolt holes 21 which receive the bolts, whereby the brackets may be secured to the housing. The bridle bar is bolted to the undersides of the stirrups 17.

An important feature of the invention is the carrier I, which includes angular hangers 22 with a transverse front plate 23 and a horizontal bottom plate 24 secured thereto, whereby the entire carrier has a general right angular shape in side elevation. The hangers are transversely spaced to fit between the flanges 16 of the brackets 14 and their upright arms lie against the inner sides of the said flanges. The arms of the hangers have bolts 25 which register with bolt holes 26 in the flanges 16, whereby the hangers may be secured to the brackets by bolts 27 passing through said bolt holes. From the foregoing, it will be apparent that the carrier which supports the winch elements may be readily bolted to the adapter brackets 14; thus by equipping each unit with the hangers 22 and providing the proper adapter brackets, the unit may be mounted on any type of tractor.

The front plate 23 and the bottom plate 24 serve as twin housing plates as will be hereinafter explained. The front plate, as shown in Fig. 5, has a plurality of vertically spaced bolt holes 28 disposed inwardly from its sides which register with bolt holes 29 in the face of the upright arms of the hangers for receiving bolts 30, whereby said plate is secured to the hangers. The bottom plate has angular flanges 31 welded to its underside and depending therefrom so as to engage the inner sides of the bottom hanger arms, whereby said plate may be secured to the hangers 22 by bolts 32. It will be observed that the plates 23 and 24 extend transversely on each side of the hangers.

The winch elements A, B, C, and D are mounted on a base 33 which is suitably bolted on the bottom plate 24. A spool shaft 35 is journaled at one end in a standard 34 carried by the base and extends through the gear case D. The spool A is rotatably confined on the shaft. Since the detailed construction of the winch assembly is not a part of the invention and is conventional, it will not be described in detail. The clutch C may be of the square jaw type and the brake B is of the usual band pattern. The gear case is suitably fastened on the base 33. Such cases are standard and include a worm gear and a worm screw (not shown) which rotate the shaft 35.

The gear case D is enclosed in the upright gear housing E which includes a portion of the front plate 23, an outer side plate 46, a rear plate 47, a partition plate 48 and a top plate 49. The side plate 46 is bolted to marginal flanges 36 and 37 carried by the plates 23 and 24 at one side. The rear plate 47 is bolted to inwardly directed upright flanges 50 on the rear vertical edges of the plates 46 (Figs. 2 and 3). The partition plate 48 is bolted to the front plate 23 by means of an upright flange 51 (Fig. 2). The top plate 49 is provided with depending flanges 53 bolted to the inner sides of the upper edge portions of the plates 46 and 48 (Figs. 2 and 4). The left hand annular flange (Fig. 2) of the spool A revolves in a circular opening 52 of the partition plate.

The housing E is made of plates of such thickness as to give it strength and rigidity and is securely united with the carrier I. The top plate 49 of the housing is cut out so that the transmissions G and H may extend therethrough. These transmissions are supported on brackets 54 secured to the inner sides of the plates 46 and 48. It is not believed necessary to illustrate the transmissions in detail. The auxiliary transmission G is of the type having an underdrive gearing and an overdrive gearing. The underdrive may have a gear rate of 1 to 2; while the overdrive may have a gear ratio of 2 to 1. This transmission will have one speed forward.

The auxiliary transmission G is connected directly to the conventional or standard transmission H. The transmission H may be of any suitable construction and preferably has four speeds forward and one in reverse. A tail shaft 55 extends rearwardly from the transmission H and has a sprocket wheel 56 fastened thereon directly over a sprocket wheel 38 of larger diameter fastened on the shaft 39 of the worm screw of the gearing D. These sprocket wheels are within the housing E and accessible by removing the rear plate 47. An endless sprocket chain 40 connects the sprocket wheels. For taking up slack in the chain, as well as for preventing it from jumping off the wheels, an idler sprocket wheel 57 is journaled on an arm 58 mounted on the front side of one of the flanges 50 and engages the chain as is shown in Fig. 2.

It will be observed that the plates 46, 47, and 48 of the housing E extend above the front plate 23 and this permits the auxiliary transmission to be mounted so that its drive shaft 59 may extend over and forwardly of the upper edge of said plate. The housing E is comparatively narrow so that the forward end of the transmission G will substantially fill the housing opening above the plate 23. A sprocket wheel 60 is fastened on the shaft 59 and is driven by an endless chain 61 which in turn is driven by a sprocket wheel 62 fastened on the power take-off shaft 13. In some installations it may be necessary to mount the shaft 13 in a clutch box 63 because in some types of tractors the driving gearing runs continuously and it is necessary to connect the power take-off therewith. However, either of the transmissions can always be shifted to a neutral position.

The clutch C and the brake B are enclosed in the upright housing F at the right hand side of the tractor (Fig. 2). This housing has the plate 23 at its front and includes an outer side plate 64, a rear plate 65, a partition plate 66 and a top plate 67. The plate 66 (Figs. 2 and 4) has a circular opening 68 which receives the right hand annular flange of the spool A. The side plate 64 is bolted to the flanges 36 and 37 at the right hand sides of the front and bottom plates 23 and 24 of the carrier I. The partition plate 66 has an upright flange 69 at its front edge (Fig. 2) directed toward the center of the plate 23 and secured thereto by bolts 70. The rear edges of the plates 64 and 66 are formed with inwardly directed flanges 71 to which the rear plate 65 is bolted; while the top plate 67 is bolted on inwardly directed flanges 72 along the upper edges of said plates.

It will be observed that the housing F is not as high as the housing E, but is also made of strong and substantial plates. The spool A is enclosed on each side by the housings which protect it and the cable wound thereon. The driving and control elements of the winch assembly are all enclosed in the housings and the entire unit is strong and sturdy and capable of standing severe usage and much abuse. At the rear corners of the housings, vertical guide rollers 73 are journaled at their upper and lower ends in brackets 74 secured to said corners. These rollers prevent a cable extending from the spool from engaging the sharp vertical edges of the housings. A transverse cable guard 75 is secured in a recess 76 in the winch base 33 between the housings.

In the housing F the usual clutch lever 77 and brake lever 78 are mounted. The clutch C acts between the spool A and the shaft 35 to connect or disconnect the said spool. The clutch lever 77 extends through a slot 79 in the top plate 67 of the housing F and is pivoted to the rear end of a link 80 (Fig. 1) which extends forwardly through a guide 81 mounted on the running board 82 of the tractor. The forward end of the link is connected to a hand lever 83 mounted on the tractor. The brake lever 78 is connected by a pitman 84 with a brake operating arm 85 and extends through the slot 79 in the top plate. A link 86 paralleling the link 80 is pivoted at its rear end to the brake lever and at its forward end to a hand lever 87 mounted on the tractor. The levers 83 and 87 may be mounted on the tractor in any suitable manner. The clutch box 63 is provided with an elongated upright shifting lever 88 which extends upward behind the seat 89 of the tractor. It will be noted that the shifting levers of the transmissions G and H are within easy reach of the driver when he is occupying the seat. Such levers may also be reached by an operator standing on the ground.

When the winch is being used to wind a cable pulling a heavy load while the tractor is stationary, it may be necessary with light weight or small tractors to provide an anchor for the operation. On the outer faces of the housing side plates 46 and 64, wedge shaped open cleats 90 are welded or otherwise secured to medial portions thereof. Each cleat has its wider end directed rearwardly of the housing. A cable anchor is formed by folding a length of cable 91 and passing its ends rearwardly through the cleats. Each end of the cable is looped around a wedge or chuck 92 and then pulled into the cleat as is shown in Fig. 8. The fold of the cable is made long enough so as to extend along each side of the tractor and forwardly thereof a sufficient distance to be engaged around a stationary anchor, such as a tree or other suitable support. By this anchoring arrangement the entire stress and strain is taken by the winch unit and substantially no part of the load is taken by the tractor.

The foregoing description of the invention is explanatory thereof and various changes in the size, shape and materials, as well as in the details of the illustrated construction may be made, so long as within the scope of the appended claims, without departing from the spirit of the invention.

What I claim and desire to secure by Letters Patent is:

1. A mobile winch unit adapted to be mounted on a tractor having a power take-off including, a carrier having means for mounting it on the rear end of a tractor, a pair of spaced upright housings mounted on each side of the carrier and having unbroken outer side walls, a winch drum between the housings having bearing supports entirely within said housings, transmission means in the upper portion of one of said housings, driving means connected to the winch drum and mounted in said housing below said transmission means, an endless sprocket chain in said housing connecting the driving means and transmission means therein, and a driving connection extending from the transmission means having means for attaching it to the power take-off of a tractor.

2. A winch unit as set forth in claim 1 with a clutch and brake co-acting with the winch drum and having operating levers contained within the other housing, whereby the outer sides of the housing are free from operating elements.

3. A carrier for a mobile winch unit adapted to be mounted on a tractor having a draw bar including, adapter brackets having means for attaching them to the tractor, a single pair of spaced angular hangers secured to the brackets, a horizontal plate secured across the horizontal arms of the hangers, an upright plate secured across the upright members of the hangers, said plates serving to enclose and support the winch unit, and a bridle bar supporting the draw bar and secured transversely of the carrier to the lower ends of the adapter brackets, the brackets serving to support the bridle bar and draw bar as well as the hangers and the winch unit.

4. A mobile winch unit adapted to be mounted on a tractor having a power take-off including, a carrier having means for attaching it to the rear end of a tractor, a horizontal winch drum mounted to revolve on the carrier and positioned transversely thereof, a sprocket wheel carried by the power take-off, an auxiliary transmission mounted longitudinally of the carrier at one end of the winch drum and having a forward sprocket wheel, a conventional transmission mounted longitudinally of the carrier rearwardly of the auxiliary transmission and in direct connection therewith, said conventional transmission being longitudinally alined with the auxiliary transmission and having a rear sprocket wheel, a worm gear drive connected to the winch drum and having a sprocket wheel, said worm gear drive being disposed at one end of the winch drum beneath the transmissions, an endless sprocket chain connecting the forward sprocket wheel of the auxiliary transmission with the sprocket wheel carried by the power take-off, and an endless sprocket chain connecting the rear sprocket wheel of the conventional transmission with the sprocket wheel of the worm gear drive.

5. A winch unit as set out in claim 4, wherein the transmissions are mounted in the upper portion of an upright housing carried by the carrier, the worm gear drive being confined in said housing, the drum having a bearing support within said housing, whereby the outer side wall of said housing is free from bearing openings.

JOHN C. JAQUES.